(12) United States Patent
Kinoshita

(10) Patent No.: US 11,211,651 B2
(45) Date of Patent: Dec. 28, 2021

(54) BATTERY COOLING CONTROL DEVICE

(71) Applicant: TOYOTA JIDOSHA KABUSHIKI KAISHA, Toyota (JP)

(72) Inventor: Kohji Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 16/690,579

(22) Filed: Nov. 21, 2019

(65) Prior Publication Data
US 2020/0243924 A1    Jul. 30, 2020

(30) Foreign Application Priority Data
Jan. 29, 2019  (JP) .............................. JP2019-013264

(51) Int. Cl.
| | |
|---|---|
| H02J 7/00 | (2006.01) |
| H01M 10/63 | (2014.01) |
| H01M 10/613 | (2014.01) |
| H01M 10/625 | (2014.01) |
| H01M 10/6563 | (2014.01) |
| H02J 7/35 | (2006.01) |
| B60H 1/00 | (2006.01) |
| B60L 58/26 | (2019.01) |

(Continued)

(52) U.S. Cl.
CPC ......... *H01M 10/63* (2015.04); *H01M 10/613* (2015.04); *H01M 10/625* (2015.04); *H01M 10/6563* (2015.04); *H02J 7/35* (2013.01); *B60H 1/00278* (2013.01); *B60K 6/28* (2013.01); *B60L 53/51* (2019.02); *B60L 58/26* (2019.02); *B60Y 2200/91* (2013.01); *B60Y 2200/92* (2013.01); *B60Y 2300/91* (2013.01); *B60Y 2306/05* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 8,258,726 | B2 * | 9/2012 | Okuda | .................... B60L 58/26 |
| | | | | 318/268 |
| 2002/0043413 | A1 * | 4/2002 | Kimishima | ......... H01M 10/613 |
| | | | | 180/68.1 |

(Continued)

FOREIGN PATENT DOCUMENTS

| | | |
|---|---|---|
| JP | 2010-166676 A | 7/2010 |
| JP | 2014-192129 A | 10/2014 |

*Primary Examiner* — Arun C Williams
(74) *Attorney, Agent, or Firm* — Oliff PLC

(57) ABSTRACT

The quietness requirement level of a charging point is determined based on the position information on the charging point where an in-vehicle battery is fast charged by an external power supply. For an air conditioner that cools the in-vehicle battery through a drive power of an electric compressor when the in-vehicle battery is charged, an upper limit of a rotation speed of the electric compressor is set in such a way that the upper limit of the rotation speed of the electric compressor is set lower when the in-vehicle battery is charged by the external power supply at a charging point where the quietness requirement level is equal to or higher than a predetermined value than when the in-vehicle battery is charged by the external power supply at a charging point where the quietness requirement level is lower than the predetermined value.

7 Claims, 5 Drawing Sheets

(51) Int. Cl.
*B60K 6/28* (2007.10)
*B60L 53/51* (2019.01)

(56) References Cited

U.S. PATENT DOCUMENTS

2003/0118891 A1* 6/2003 Saito ................ H01M 10/6563
429/62
2010/0270976 A1* 10/2010 Tamura ............. H01M 10/6563
320/136
2014/0335771 A1* 11/2014 Kikuchi ................ B60L 3/0046
454/75
2016/0301115 A1* 10/2016 Izumi ................. H01M 10/486

\* cited by examiner

FIG. 4

| EXTERNAL POWER SUPPLY INSTALLATION POINT | POSITION INFORMATION | QUIETNESS REQUIREMENT LEVEL |
|---|---|---|
| POINT 1 | x1, y1 | LOW |
| POINT 2 | x2, y2 | HIGH |
| POINT 3 | x3, y3 | LOW |
| ⋮ | ⋮ | ⋮ |

BATTERY COOLING CONTROL DEVICE

INCORPORATION BY REFERENCE

The disclosure of Japanese Patent Application No. 2019-013264 filed on Jan. 29, 2019 including the specification, drawings and abstract is incorporated herein by reference in its entirety.

BACKGROUND

1. Technical Field

The present disclosure relates to a battery cooling control device.

2. Description of Related Art

Japanese Patent Application Publication No. 2014-192129 (JP 2014-192129 A) discloses a technique in which, when the in-vehicle battery is charged by an external power supply in the period of time from midnight to early morning, the second driving mode is performed in which the ratio of power supplied to the blower of the temperature adjustment unit, which adjusts the temperature of the in-vehicle battery, is low.

SUMMARY

When the in-vehicle battery is charged by an external power supply in the period of time except from midnight to early morning, the technique described in Japanese Patent Application Publication No. 2014-192129 (JP 2014-192129 A) performs the first driving mode in which the ratio of power supplied to the blower is higher than that in the second drive mode. As a result, depending on the surrounding environment, the operation of the blower may cause noises, which may cause the discomfort to the people around the host vehicle.

The present disclosure provides a battery cooling control device that can relieve the discomfort to the people around the host vehicle when the in-vehicle battery is charged by an external power supply while cooling the in-vehicle battery at the same time.

A battery cooling control device according to the disclosure described in claim 1 includes a determination unit configured to determine a quietness requirement level of a charging point based on position information on the charging point, wherein the charging point is a point where an in-vehicle battery is charged by an external power supply; and a control unit configured to set, for a cooling unit that cools the in-vehicle battery through a drive power of a motor when the in-vehicle battery is charged, an upper limit of a rotation speed of the motor in such a way that the upper limit of the rotation speed of the motor is lower when the in-vehicle battery is charged by the external power supply at a charging point where the quietness requirement level is equal to or higher than a predetermined value than when the in-vehicle battery is charged by the external power supply at a charging point where the quietness requirement level is lower than the predetermined value.

In the disclosure described in claim 1, the cooling unit cools the in-vehicle battery through the drive power of the motor when the in-vehicle battery is charged. In this case, the upper limit of the rotation speed of the motor of the cooling unit is set lower when the in-vehicle battery is charged by the external power supply at a charging point where the quietness requirement level is equal to or higher than the predetermined value than when the in-vehicle battery is charged by the external power supply at a charging point where the quietness requirement level is lower than the predetermined value. As a result, when the quietness requirement level of the charging point is equal to or higher than the predetermined value at the time the in-vehicle battery is charged by the external power supply, the upper limit of the rotation speed of the motor of the cooling unit is reduced and, therefore, the operation noise of the motor is reduced. Thus, setting the upper limit of the rotation speed of the motor in this way will relieve the discomfort to the people around the host vehicle when the in-vehicle battery is charged by the external power supply while cooling the in-vehicle battery.

The disclosure described in claim 2 is the disclosure according to claim 1 wherein the determination unit is configured to determine the quietness requirement level of the charging point by comparing the position information on the charging point acquired from a GPS sensor with first information or second information. The first information divides regions on a map into regions each with a different quietness requirement level, and the second information indicates the quietness requirement level of each point where the external power supply is installed.

As described in claim 2, the quietness requirement level of a charging point can be determined, for example, by comparing the position information on the charging point, acquired from the GPS sensor, with the first information or the second information described above. As a result, the quietness requirement level of a charging point can be determined more quickly and reliably than when the categories of multiple lands around the charging point are acquired for comprehensively determining the quietness requirement level.

The disclosure described in claim 3 is the disclosure according to claim 1 or 2 wherein the charging point with the quietness requirement level equal to or higher than the predetermined value is a point included in at least one of a residential region, a nature reserve region, and a park.

The residential region, nature reserve region, and park described in claim 3 are all regions with a high quietness requirement level. The upper limit of the rotation speed of the motor is set low when a charging point is included in any of these regions. By doing so, the quietness of the residential region, nature reserve region, and park, which includes the charging point, can be prevented from being lost.

The disclosure described in claim 4 is the disclosure according to any one of claims 1 to 3, wherein the motor of the cooling unit is a motor driving an electric compressor that circulates a heat exchange medium for cooling the in-vehicle battery.

The motor of the electric compressor generates noises as it compresses the heat exchange medium during rotation. Setting a lower upper limit of the rotation speed of the motor of the electric compressor when the in-vehicle battery is charged reduces the noises generated by compressing the heat exchange medium during the rotation of the motor of the electric compressor, making it possible to relieve the discomfort to the people around the host vehicle.

The disclosure described in claim 5 is the disclosure according to any one of claims 1 to 3, wherein the motor of the cooling unit is a blower motor that blows air to the in-vehicle battery.

The blower motor generates blowing noises during rotation. Setting a lower upper limit of the rotation speed of the blower motor when the in-vehicle battery is charged by an external power supply reduces the blowing noise generated when the blower motor is rotated, making it possible to relieve the discomfort to the people around the host vehicle.

The disclosure described in claim 6 is the disclosure according to any one of claims 1 to 5, further including a sunlight detection unit configured to detect sunlight wherein the control unit is configured to set the upper limit of the rotation speed of the motor in such a way that the upper limit of the rotation speed of the motor is lower when the in-vehicle battery is charged by the external power supply with sunlight not detected by the sunlight detection unit than when the in-vehicle battery is charged by the external power supply with sunlight detected by the sunlight detection unit.

In the disclosure described in claim 6, the operation noise of the motor is reduced by setting the upper limit of the rotation speed of the motor of the cooling unit lower when the in-vehicle battery is charged by an external power supply with sunlight not detected by the sunlight detection unit. Setting the upper limit of the rotation speed of the motor of the cooling unit in this way relieves the discomfort to the people around the host vehicle even when the in-vehicle battery is charged by an external power supply at a period of time during which sunlight is not detected by the sunlight detection unit.

The disclosure described in claim 7 is the disclosure according to any one of claims 1 to 6, further including a noise detection unit configured to detect surrounding noise wherein the control unit is configured to set the upper limit of the rotation speed of the motor in such a way that the upper limit of the rotation speed of the motor is lower when the in-vehicle battery is charged by the external power supply at a charging point where a level of the surrounding noise detected by the noise detection unit is lower than a predetermined value than when the in-vehicle battery is charged by the external power supply at a charging point where the level of the surrounding noise detected by the noise detection unit is equal to or higher than the predetermined value.

In the disclosure described in claim 7, the operation noise of the motor is reduced by setting the upper limit of the rotation speed of the motor of the cooling unit lower when the in-vehicle battery is charged by an external power supply at a charging point where the surrounding noise is lower than a predetermined value. Setting the upper limit of the rotation speed of the motor of the cooling unit in this way relieves the discomfort to the people around the host vehicle even when the surrounding noise is lower than the predetermined value at the time the in-vehicle battery is charged by the external power supply.

The present disclosure can relieve the discomfort to the people around the host vehicle when the in-vehicle battery is charged by an external power supply while cooling the in-vehicle battery at the same time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a table showing an example of quietness requirement level information.

DETAILED DESCRIPTION OF EMBODIMENTS

Figure 1:
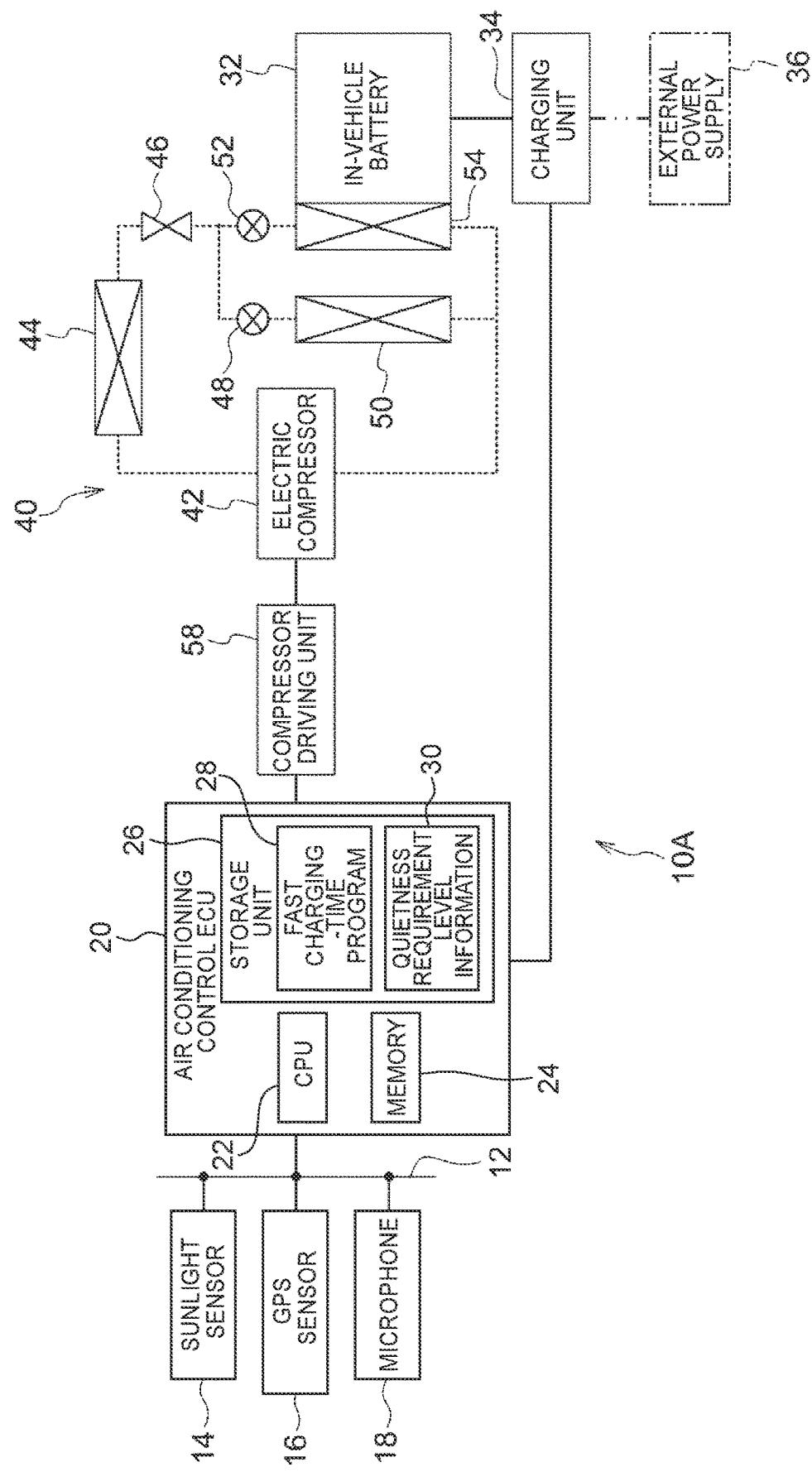
FIG. 1 is a schematic configuration diagram showing an example of an in-vehicle system according to an embodiment.

An example of an embodiment of the present disclosure will be described in detail below with reference to the drawings. An in-vehicle system 10A shown in FIG. 1 includes a bus 12. To the bus 12, a sunlight sensor 14, a global positioning system (GPS) sensor 16, a microphone 18, and an air conditioning control electronic control unit (ECU) 20 are connected. FIG. 1 shows only a part of the in-vehicle system 10A. In the description below, a vehicle on which the in-vehicle system 10A is mounted is referred to as a host vehicle.

The sunlight sensor 14 detects whether the host vehicle is in the sunlight (whether the host vehicle is exposed to sunlight) and outputs the detection result to the air conditioning control ECU 20. The GPS sensor 16 receives GPS signals from a plurality of GPS satellites to position the host vehicle and outputs the position information on the host vehicle to the air conditioning control ECU 20. The microphone 18 detects background noise around the host vehicle and outputs the volume of the detected background noise to the air conditioning control ECU 20. The sunlight sensor 14 is an example of a sunlight detection unit in the present disclosure, and the microphone 18 is an example of a noise detection unit in the present disclosure.

On the other hand, an in-vehicle battery 32 that supplies electric power to the motor is mounted on the host vehicle. This motor generates torque for driving the drive wheels of the host vehicle. The vehicle on which the in-vehicle system 10A is mounted may be a hybrid vehicle or an electric vehicle. A charging unit 34 is connected to the in-vehicle battery 32. When the in-vehicle battery 32 is charged, an external power supply 36 is connected to the charging unit 34. The charging unit 34 charges the in-vehicle battery 32 by the electric power supplied from the external power supply 36.

The in-vehicle system 10A includes an air conditioner 40 that air-conditions the interior of the host vehicle and, at the same time, cools the in-vehicle battery 32. The air conditioner 40 includes an electric compressor 42 that compresses the heat exchange medium. To the heat-exchange-medium discharge side of this electric compressor 42, an outdoor heat exchanger 44 is connected. The electric compressor 42 is an example of a motor in the present disclosure.

On the downstream side of the outdoor heat exchanger 44, an expansion valve 46 is provided. On the downstream side of this expansion valve 46, an evaporator 50 and a battery cooling heat exchanger 54 are provided in parallel. An electromagnetic valve 48 is provided between the expansion valve 46 and the evaporator 50, and an electromagnetic valve 52 is provided between the expansion valve 46 and the battery cooling heat exchanger 54. The opening and closing of the electromagnetic valves 48 and 52 is controlled by the air conditioning control ECU 20.

The evaporator 50 is arranged in the heating, ventilation, and air conditioning (HVAC) unit not shown. When the electric compressor 42 is driven and the electromagnetic valve 48 is opened, the air cooled or dehumidified by the evaporator 50 is supplied to the vehicle interior via a plurality of vents provided in the HVAC unit. In addition, the battery cooling heat exchanger 54 is arranged at a position where heat can be absorbed from the in-vehicle battery 32. When the electric compressor 42 is driven and the electromagnetic valve 52 is opened, the in-vehicle battery 32 is cooled by the battery cooling heat exchanger 54. The air conditioner 40 is an example of a cooling unit in the present disclosure.

Figure 2:
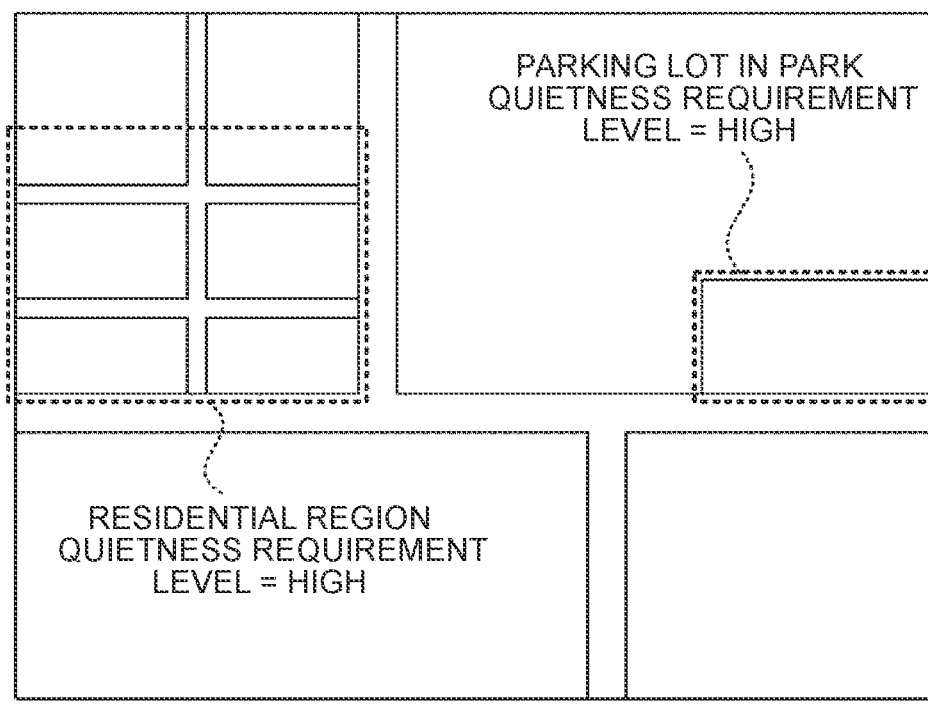
FIG. 2 is a diagram showing an example of the image of quietness requirement level information.

The air conditioning control ECU 20 includes a CPU 22, a memory 24, and a non-volatile storage unit 26 that stores a fast charging-time program 28 and the quietness requirement level information 30. The fast charging-time program 28 is read, as necessary, from the storage unit 26 into the memory 24. The air conditioning control ECU 20 performs the fast charging-time processing when the fast charging-time program 28, which has been read into the memory 24, is executed by the CPU 22. The fast charging-time processing will be described later, As shown in the example in FIG. 2, the quietness requirement level information 30 divides the regions on a map into two types of region: regions where a high quietness requirement level is required and other regions where a high quietness requirement level is not required. FIG. 2 shows an example in which the residential region and the parking lot in the park are defined as regions with a high quietness requirement level. Note that the regions with a high quietness requirement level are not limited to residential regions and parks but that nature reserve regions may be a region with a high quietness requirement level. In FIG. 2, the regions other than the regions with a high quietness requirement level are the regions with a low quietness requirement level. An example of a region with a low quietness requirement level is a commercial region. The quietness requirement level information 30 shown in FIG. 2 is an example of first information.

A compressor driving unit 58 is connected to the air conditioning control ECU 20. The compressor driving unit 58 drives the electric compressor 42 when an instruction is received from the air conditioning control ECU 20. The charging unit 34 is connected to the air conditioning control ECU 20. The charging unit 34 notifies the air conditioning control ECU 20 when the external power supply 36 is connected for fast charging the in-vehicle battery 32.

The air conditioning control ECU 20 is an example of a battery cooling control device according to the present disclosure. The air conditioning control ECU 20 functions as an example of the determination unit and the control unit in the present disclosure.

Next, the operation of this embodiment will be described below. When the in-vehicle battery 32 is fast charged by the external power supply 36, the amount of heat generation of the in-vehicle battery 32 increases. Therefore, when a notification indicating that the in-vehicle battery 32 will be fast charged is received from the charging unit 34, the air conditioning control ECU 20 performs the fast charging-time processing, shown in FIG. 3, to cause the battery cooling heat exchanger 54 of the air conditioner 40 to cool the in-vehicle battery 32.

In step 100 of the fast charging-time processing, the air conditioning control ECU 20 acquires, from the sunlight sensor 14, the detection result of the sunlight sensor 14 indicating whether the host vehicle is exposed to sunlight. In step 102, the air conditioning control ECU 20 determines whether sunlight is detected by the sunlight sensor 14 (that is, whether it is in the daytime or night-time). When sunlight is detected by the sunlight sensor 14, step 102 is affirmatively determined and the processing proceeds to step 104.

In step 104, the air conditioning control ECU 20 acquires the information on the current position of the host vehicle from the GPS sensor 16. In step 106, the air conditioning control ECU 20 compares the position information, acquired in step 104, with the quietness requirement level information 30, stored in the storage unit 26, to recognize the current position of the host vehicle on the map of the quietness requirement level information 30. In step 108 that follows, the air conditioning control ECU 20 determines whether the quietness requirement level at the current position of the host vehicle is equal to or higher than a predetermined value. For example, when the current position of the host vehicle is not in a region such as the residential region, step 108 is negatively determined and the processing proceeds to step 110. The processing in step 104 to step 108 is the processing corresponding to an example of the determination unit in the present disclosure.

In step 110, the air conditioning control ECU 20 acquires the volume of the background noise around the host vehicle from the microphone 18. In step 112, the air conditioning control ECU 20 determines whether the volume of the background noise around the host vehicle is equal to or greater than a predetermined value. When the volume of the background noise around the host vehicle is equal to or greater than the predetermined value, step 112 is affirmatively determined and the processing proceeds to step 114.

In step 114, the air conditioning control ECU 20 opens the electromagnetic valve 52 and, at the same time, drives the electric compressor 42 with the upper limit of the rotation speed of the electric compressor 42 set to the maximum rotation speed (for example, 8600 [rpm]). As a result, when the temperature of the in-vehicle battery 32 rises as the in-vehicle battery 32 is fast charged by the external power supply 36, the rotation speed of the electric compressor 42 is increased to the maximum rotation speed, with the result that the in-vehicle battery 32 is cooled and the temperature rise of the in-vehicle battery 32 is reduced. In addition, a reduction in the temperature rise of the in-vehicle battery 32 leads to an increase in the charging current of the in-vehicle battery 32, meaning that the time required for fast charging is reduced.

Note that, when the rotation speed of the electric compressor 42 rises to the maximum rotation speed, the volume of the noise generated as the electric compressor 42 compresses the heat exchange medium also increases. However, the processing in step 114 is performed when the sunlight sensor 14 detects that the host vehicle is exposed to sunlight, when the quietness requirement level of the current position of the host vehicle is less than the predetermined value, and when the volume of the background noise around the host vehicle is equal to or higher than the predetermined value. For this reason, it is less likely that the noise generated as the electric compressor 42 compresses the heat exchange medium gives an uncomfortable feeling to the people around the host vehicle.

On the other hand, the processing proceeds to step 116 when the sunlight sensor 14 detects that the host vehicle is not exposed to sunlight and, as a result, step 102 is negatively determined, when the quietness requirement level of the current position of the host vehicle is equal to or greater than the predetermined value and, as a result, step 108 is affirmatively determined, or when the volume of the background noise around the host vehicle is less than the predetermined value and, as a result, step 112 is negatively determined.

In step 116, the air conditioning control ECU 20 opens the electromagnetic valve 52 and, at the same time, drives the electric compressor 42 with the upper limit of the rotation speed of the electric compressor 42 set to a rotation speed lower than the maximum rotation speed (for example, 5200 [rpm]). As a result, the maximum volume of the noise generated as the electric compressor 42 compresses the heat exchange medium in this case becomes small as compared with the maximum volume of the noise generated when the upper limit of the rotation speed of the electric compressor 42 is set to the maximum rotation speed. Therefore, it is less likely that the generated noise gives an uncomfortable feeling to the people around the host vehicle even when the noise is generated at night during which sunlight is not detected, when the quietness requirement level of the current position of the host vehicle is equal to or higher than the predetermined value, or when the volume of the background noise around the host vehicle is lower than the predetermined value. In addition, though the upper limit of the rotation speed of the electric compressor 42 is set to a lower speed, the air conditioner 40 cools the in-vehicle battery 32 and, therefore, the fast charging can be completed within a reasonable time.

In this embodiment, when the in-vehicle battery 32 is charged by the external power supply 36, the air conditioner 40 cools the in-vehicle battery 32 through the drive power of the electric compressor 42 as described above. In this case, the upper limit of the rotation speed of the electric compressor 42 is set lower when the in-vehicle battery 32 is charged by the external power supply 36 at a charging point where the quietness requirement level is equal to or higher than the predetermined value than when the in-vehicle battery 32 is charged by the external power supply 36 at a charging point where the quietness requirement level is lower than the predetermined value. Setting the upper limit of the rotation speed of the electric compressor 42 in this way will relieve the discomfort to the people around the host vehicle even when the in-vehicle battery 32 is charged by the external power supply 36 at a charging point where the quietness requirement level is equal to or higher than the predetermined value while cooling the in-vehicle battery 32.

In addition, in this embodiment, the quietness requirement level at a charging point is determined by comparing the position information on the charging point, acquired from the GPS sensor 16, with the quietness requirement level information 30. This quietness requirement level information 30 is the information that divides the regions on the map into regions with a high quietness requirement level and the other regions with a low quietness requirement level. Therefore, the quietness requirement level at a charging point can be determined quickly and reliably.

In addition, in this embodiment, the upper limit of the rotation speed of the electric compressor 42 is set lower when the in-vehicle battery 32 is charged by the external power supply 36 with sunlight not detected by the sunlight sensor 14 than when the in-vehicle battery 32 is charged by the external power supply 36 with sunlight detected by the sunlight sensor 14. Setting the upper limit of the rotation speed of the electric compressor 42 in this way will relieve the discomfort to the people around the host vehicle even when the in-vehicle battery 32 is charged by the external power supply 36 at a period of time during which sunlight is not detected by the sunlight sensor 14.

In addition, in this embodiment, the upper limit of the rotation speed of the electric compressor 42 is set lower when the in-vehicle battery 32 is charged by the external power supply 36 at a charging point where the background noise detected by the microphone 18 is less than a predetermined value than when the in-vehicle battery 32 is charged by the external power supply 36 at a charging point where the background noise detected by the microphone 18 is equal to or greater than the predetermined value. Setting the upper limit of the rotation speed of the electric compressor 42 in this way will relieve the discomfort to the people around the host vehicle even when the background noise when the in-vehicle battery 32 is charged by the external power supply 36 is less than the predetermined value.

As an example of the quietness requirement level information 30, the information such as that shown in FIG. 2, which divides the regions on the map into regions with a high quietness requirement level and regions with a low quietness requirement level, is used in the description above. Note that the quietness requirement level information 30 is not limited to that shown above. For example, as shown in FIG. 4, the quietness requirement level information 30 may be the information that indicates the position of each point where the external power supply 36 is installed and the quietness requirement level for that position. The information shown in FIG. 4 is an example of the second information.

In the configuration described above, the electric compressor 42 is driven to cause the battery cooling heat exchanger 54 of the air conditioner 40 to cool the in-vehicle battery 32. Note that the present disclosure is not limited to this configuration. For example, an in-vehicle system 10B shown in FIG. 5 includes a blower motor 62 that cools the in-vehicle battery 32 by sending air to the in-vehicle battery 32. The blower motor 62 is connected to the air conditioning control ECU 20 via a blower driving unit 64.

Figure 5:
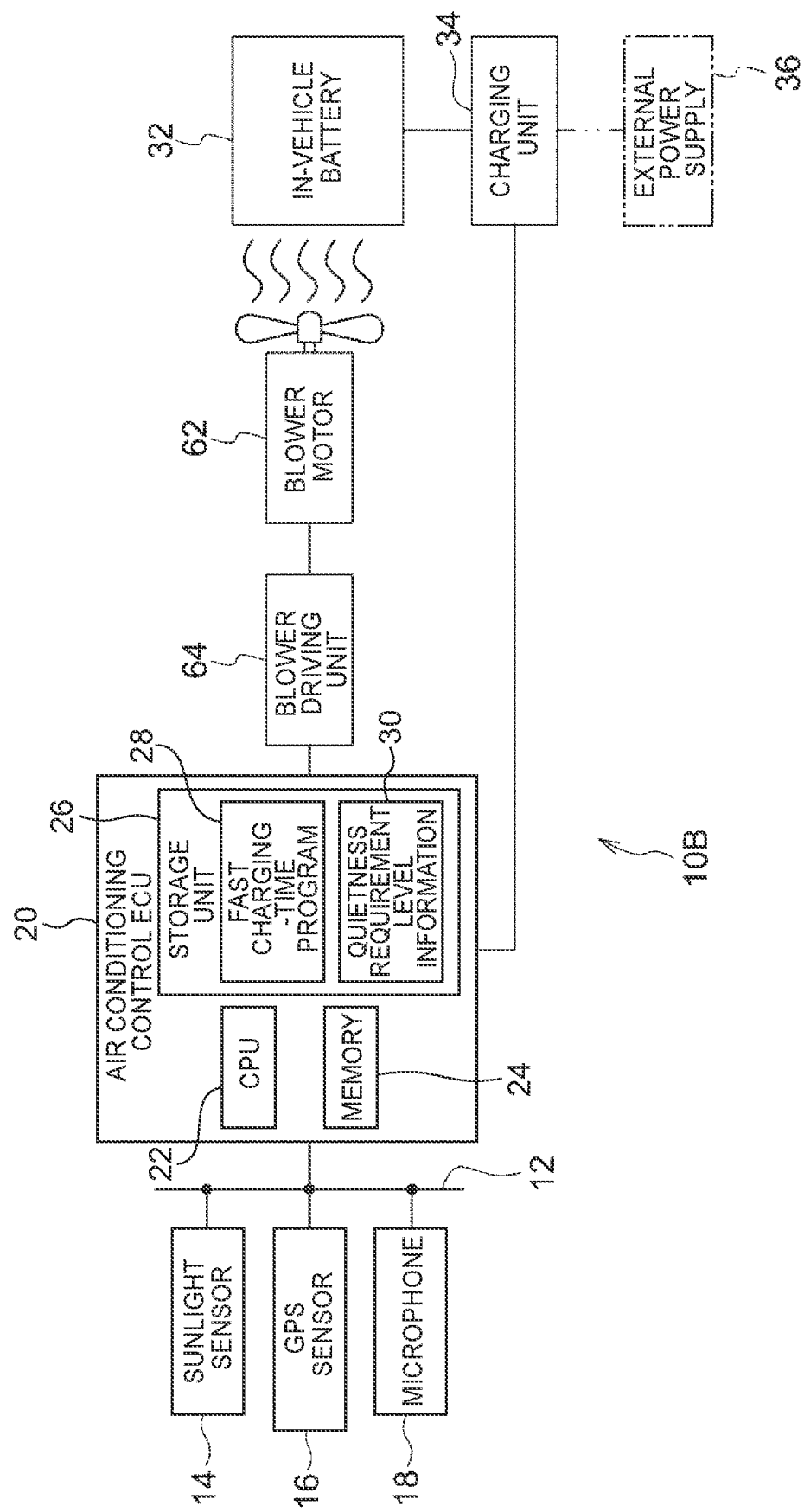
FIG. 5 is a schematic configuration diagram showing another example of an in-vehicle system.

In this configuration, when the in-vehicle battery 32 is fast charged, the upper limit of the rotation speed of the blower motor 62 may be set to a rotation speed lower than the maximum rotation speed for driving the blower motor 62 when the sunlight sensor 14 does not detect sunlight, when the quietness requirement level of the current position of the host vehicle is determined to be equal to or higher than a predetermined value, or when the volume of the background noise around the host vehicle is determined to be less than the predetermined value. The blower motor 62 in the configuration shown in FIG. 5 is an example of the motor in the present disclosure.

Figure 3:
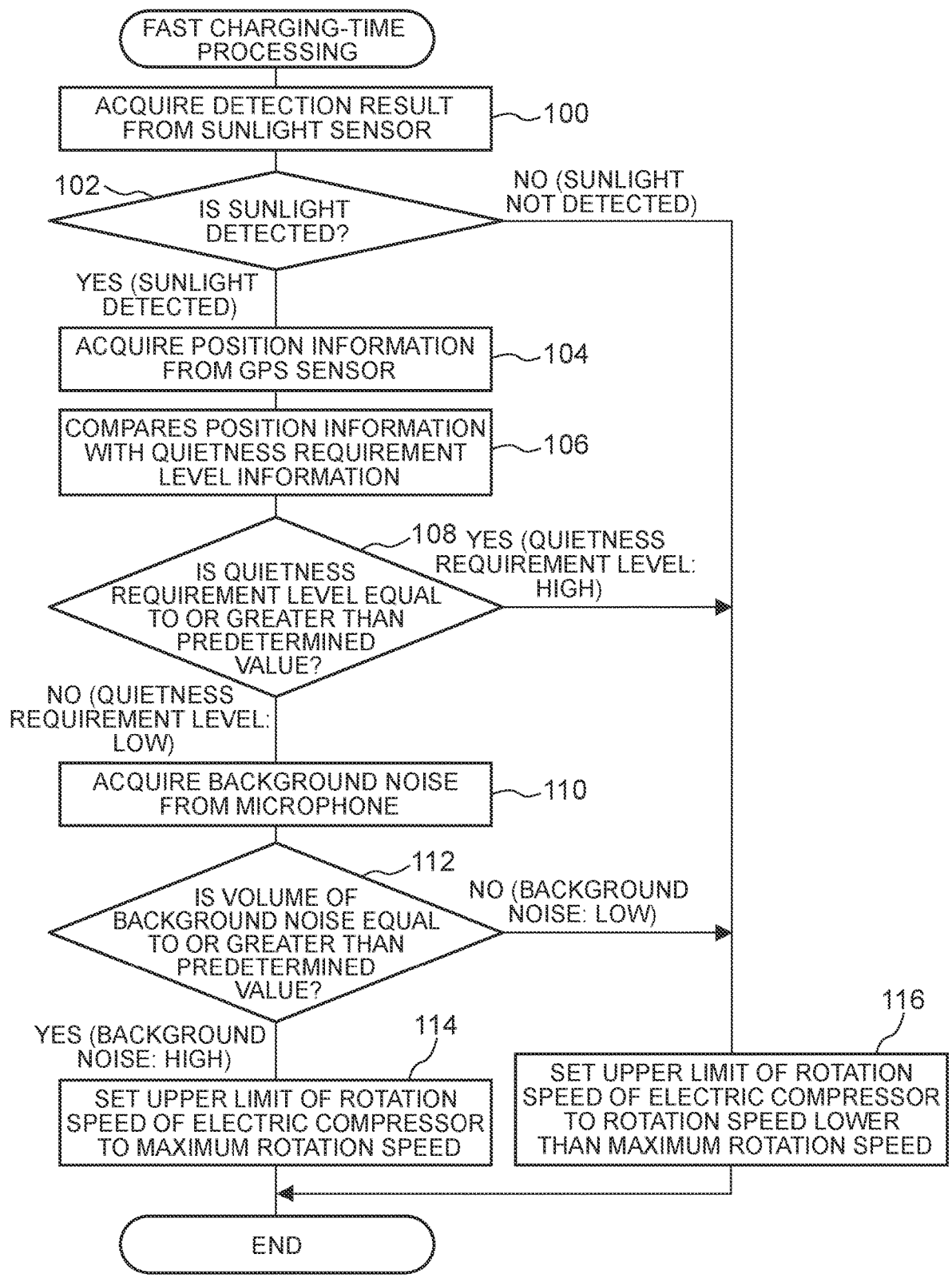
FIG. 3 is a flowchart showing the fast charging-time processing.

In the above description, the processing shown in FIG. 3 is performed when the in-vehicle battery 32 is fast charged. However, the processing shown in FIG. 3 is not limited to fast charging but is applicable to non-fast charging.

In the above description, the quietness requirement is divided into two levels. However, the present disclosure is not limited to two levels of quietness requirement. The quietness requirement may be divided into three or more levels, and the upper limit of the rotation speed of the motor may be switched to three or more levels depending upon the quietness requirement level.

What is claimed is:

1. A battery cooling control device comprising:
  a determination unit configured to determine a quietness requirement level of a charging point based on position information on the charging point, the charging point being a point where an in-vehicle battery is charged by an external power supply; and
  a control unit configured to set, for a cooling unit that cools the in-vehicle battery through a drive power of a motor when the in-vehicle battery is charged, an upper limit of a rotation speed of the motor in such a way that the upper limit of the rotation speed of the motor is lower when the in-vehicle battery is charged by the external power supply at a charging point where the quietness requirement level is equal to or higher than a predetermined value than when the in-vehicle battery is charged by the external power supply at a charging point where the quietness requirement level is lower than the predetermined value.

2. The battery cooling control device according to claim 1 wherein
the determination unit is configured to determine the quietness requirement level of the charging point by comparing the position information on the charging point acquired from a GPS sensor with first information or second information, the first information dividing regions on a map into regions each with a different quietness requirement level, the second information indicating the quietness requirement level of each point where the external power supply is installed.

3. The battery cooling control device according to claim 1 wherein
the charging point with the quietness requirement level equal to or higher than the predetermined value is a point included in at least one of a residential region, a nature reserve region, and a park.

4. The battery cooling control device according to claim 1, wherein
the motor of the cooling unit is a motor of an electric compressor that circulates a heat exchange medium for cooling the in-vehicle battery.

5. The battery cooling control device according to claim 1, wherein
the motor of the cooling unit is a blower motor that blows air to the in-vehicle battery.

6. The battery cooling control device according to claim 1, further comprising
a sunlight detection unit configured to detect sunlight wherein
the control unit is configured to set the upper limit of the rotation speed of the motor in such a way that the upper limit of the rotation speed of the motor is lower when the in-vehicle battery is charged by the external power supply with sunlight not detected by the sunlight detection unit than when the in-vehicle battery is charged by the external power supply with sunlight detected by the sunlight detection unit.

7. The battery cooling control device according to claim 1, further comprising
a noise detection unit configured to detect surrounding noise wherein
the control unit is configured to set the upper limit of the rotation speed of the motor in such a way that the upper limit of the rotation speed of the motor is lower when the in-vehicle battery is charged by the external power supply at a charging point where a level of the surrounding noise detected by the noise detection unit is lower than a predetermined value than when the in-vehicle battery is charged by the external power supply at a charging point where the level of the surrounding noise detected by the noise detection unit is equal to or higher than the predetermined value.

* * * * *